Nov. 29, 1949  S. R. DU BRIE  2,489,705
LOCKING TRAILER HITCH
Filed June 28, 1946  3 Sheets-Sheet 2
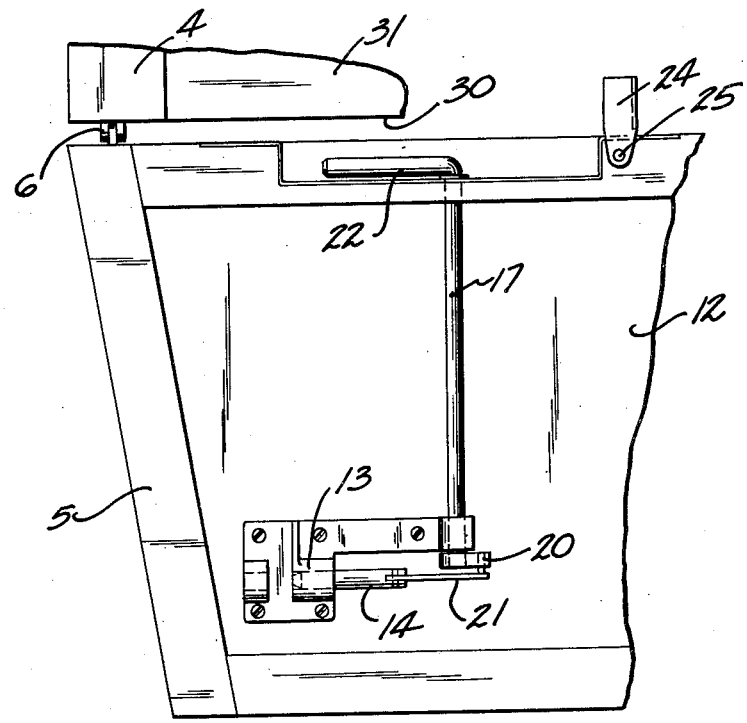
FIG. 6.
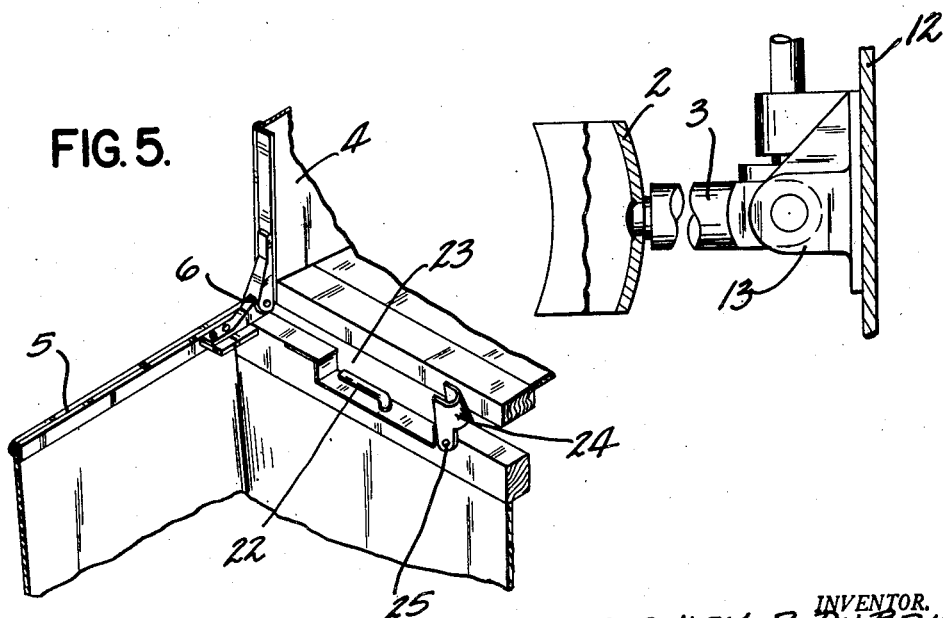
FIG. 7.
FIG. 5.
INVENTOR.
STANLEY R. DU BRIE
BY
Barnes, Kisselle, Laughlin & Raisch
ATTORNEYS.

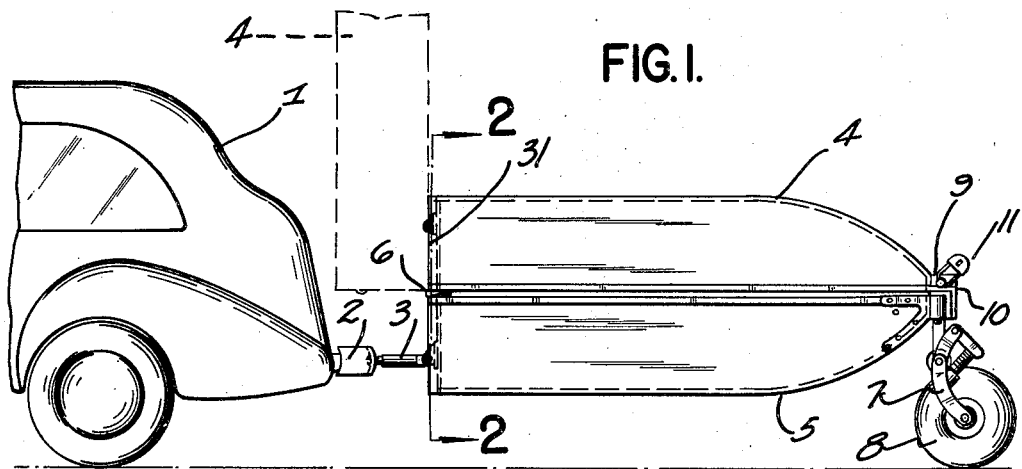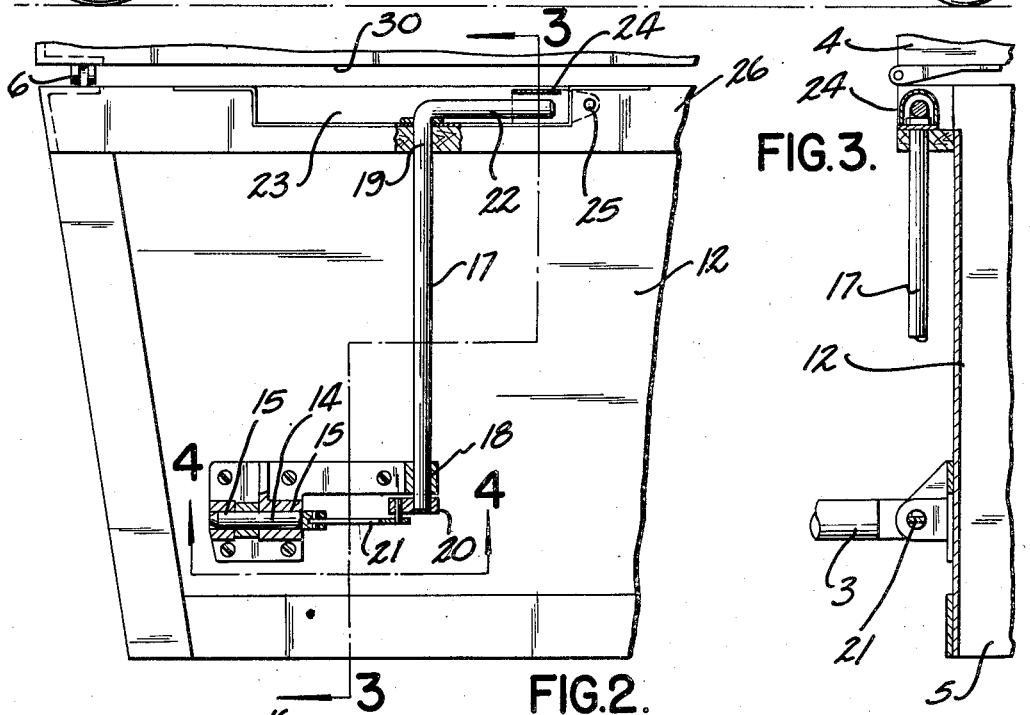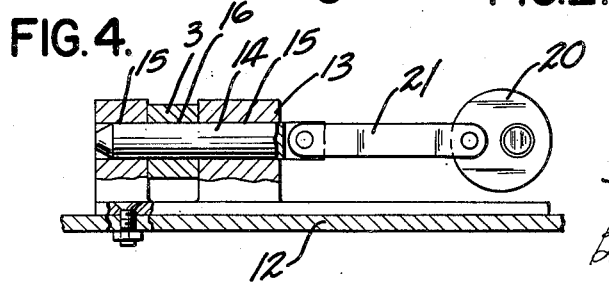

Nov. 29, 1949  S. R. DU BRIE  2,489,705
LOCKING TRAILER HITCH
Filed June 28, 1946  3 Sheets-Sheet 3
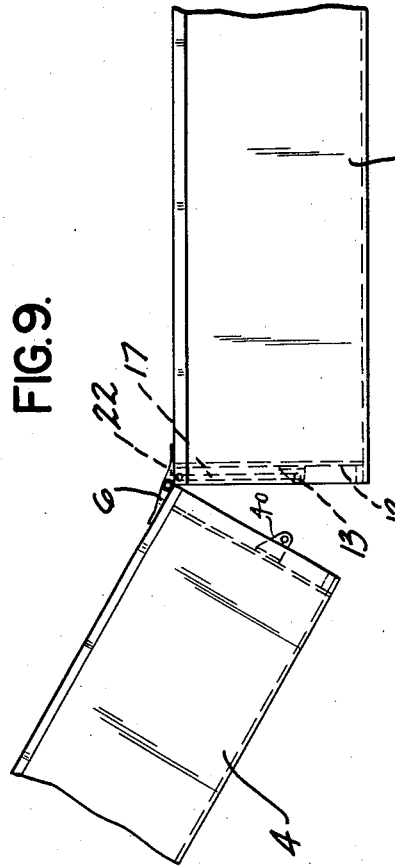
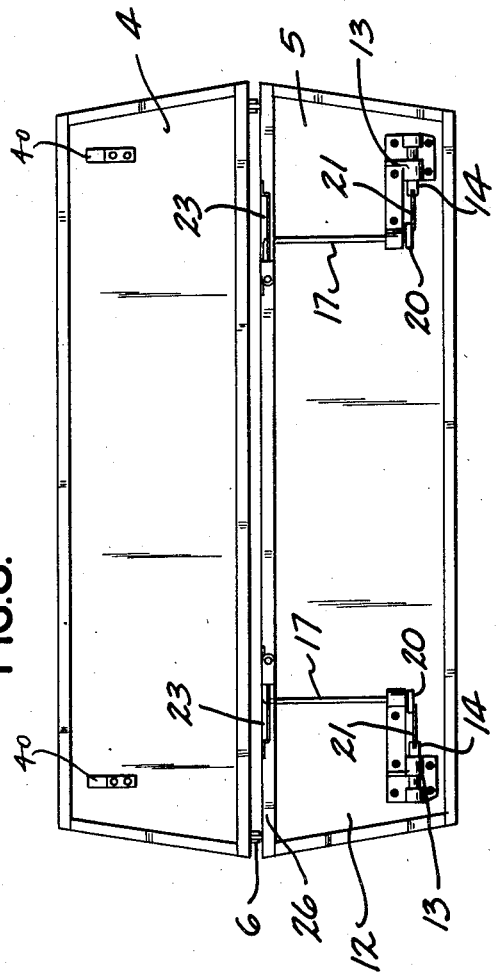
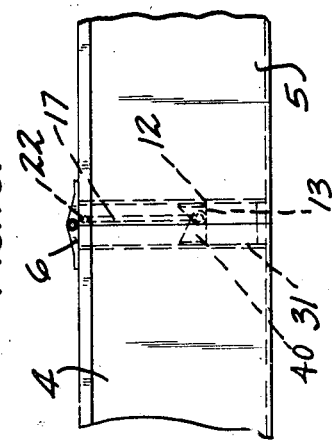
INVENTOR.
STANLEY R. DUBRIE.
BY
Barnes, Kisselle, Laughlin & Raisch
ATTORNEYS.

Patented Nov. 29, 1949

2,489,705

UNITED STATES PATENT OFFICE 2,489,705

LOCKING TRAILER HITCH

Stanley R. DuBrie, Detroit, Mich., assignor to Detroit Engineering Laboratories, Inc., Detroit, Mich., a corporation of Michigan Application June 28, 1946, Serial No. 680,034

12 Claims. (Cl. 9—1)

This invention relates to a locking trailer hitch and in particular to a combination folding trailer boat and a locking hitch therefor.

It is an object of this invention to produce a hitch for connecting a folding trailer boat to a towing vehicle, such as an automobile, which will effectively prevent unauthorized unhitching of the trailer boat from its towing vehicle.

It is an object of this invention to produce a locking hitch for a trailer boat which is thief-proof, simple, and efficient in operation.

Fig. 1 is a side elevation showing my combination trailer boat and hitch.

Fig. 2 is a section along the line 2—2 of Fig. 1.

Fig. 3 is a section along the line 3—3 of Fig. 2.

Fig. 4 is a section along the line 4—4 of Fig. 2.

Fig. 5 is a perspective showing of the boat unfolded to release the locking hitch.

Fig. 6 is a rear elevation showing the locking hitch released.

Fig. 7 is a detail of the hitch.

Fig. 8 is a rear elevation of the folded trailer boat.

Fig. 9 is a fragmentary side elevation of the trailer boat almost completely unfolded.

Fig. 10 is a fragmentary side elevation showing the trailer boat completely unfolded and the two boat sections locked together.

Referring more particularly to the drawings, I have shown a towing vehicle in the form of an automobile 1 having a bumper 2 to which is welded or otherwise affixed a pair of eyelet members 3.

My folding boat comprises two half sections 4 and 5 each of which is a complete boat unit in itself. Sections 4 and 5 are hinged together at their stern ends by hinge members 6 so that they can be folded one upon the other, as shown in Fig. 1. Section 4 can be swung counterclockwise, as viewed in Fig. 1, 180° and locked in this position so that the two sections 4 and 5 when thus locked in alignment stern to stern form one large boat. Section 5 has swiveled thereto a fork 7 and a pneumatic rubber tired wheel 8 which supports the boat while being transported. Thus, in collapsed position the boat 4, 5 acts as a trailer.

Sections 4 and 5 are provided with eyelet members 9 which are positioned side by side when the boat is collapsed, as shown in Fig. 1, and the hasp 10 of a padlock 11 can be passed through the eyelet members 9 to lock sections 4 and 5 together so that they cannot be unfolded.

The stern end 12 of boat section 5 has permanently affixed thereto, such as by welding or bolts, a pair of eyelet members 13 each of which interengages an eyelet member 3. Eyelet members 13 are each provided with a bolt 14 which is slidably mounted in eyelet openings 15. When openings 15 are aligned with opening 16 in eyelet 3, bolt 14 can be passed therethrough, Fig. 4, to lock eyelets 3 and 13 together. Projection and retraction of each bolt 14 is effected by means of a vertical spindle 17 journalled in bearings 18 and 19 on the stern end 12 of section 5 and having a crank 20 affixed to the lower end thereof and connected with bolt 14 by link 21. The upper end of vertical spindle 17 is provided with a handle 22 which is arranged to swing into and out of a notch 23 in the upper edge of stern wall 12. A latch member in the form of a channel 24 is pivoted as at 25 on the upper edge 26 of wall 12.

The operation of my locking hitch is as follows: When it is desired to hitch my boat to the automotive vehicle 1 the boat is folded, as shown in Fig. 1, and is positioned with eyelets 3 in eyelets 13. The folded boat can be manually held in this position or supported in any suitable manner such as by an ordinary wooden block. While in this position section 4 is swung upwardly about hinge 6 at least 90°, as shown in the dotted lines Fig. 1 and in the full lines Fig. 6. This removes the upper edge 30 of the stern wall 31 of boat section 4 from above pivoted latch 24 so that latch 24 can be swung upwardly from the position shown in Fig. 2 to that shown in Figs. 5 and 6 so that latch 24 disengages handle 22. Handle 22 is now swung from the position shown in Figs. 2 and 4 180° to the position shown in Figs. 5 and 6 which retracts bolt 14 so that eyelet 3 can now be moved into eyelet 13 whereupon bolt 14 is projected through eyelet 3, Figs. 2 and 4, by rotating spindle 17 from the position shown in Fig. 6 to that shown in Fig. 2. Latch 24 is now swung down so that it interengages handle 22 and prevents pivoting of spindle 17 and retraction of bolt 14. Boat section 4 is now lowered to the position shown in Fig. 1 so that the upper edge 30 of the stern end 31 is immediately above latch 24 and prevents any one from pivoting latch 24 upwardly out of engagement with handle 22. Section 4 is now locked in folded position to section 5 by any suitable lock such as padlock 11.

As long as boat section 4 rests upon section 5 in folded position, Fig. 1, edge 30 prevents the disengagement of latch 24 from handle 22 and therefore bolt 14 cannot be retracted out of interengagement with eyelet 3. There will, of course, be a pair of eyelets 3 and 13, one on each side of the boat and bumper 2. Thus, while being towed, the hitch between vehicle 1 and the boat cannot be disengaged and if the vehicle and boat are parked for the night, theft of the boat and the contents stored therein is positively prohibited because bolts 14 cannot be retracted unless lock 11 is first broken and section 4 elevated to vertical position.

It is also evident from the above that even if lock 11 is omitted from my trailer boat assembly that I have provided a simple and efficient hitch for a trailer boat which is positively locked against disengagement so that the trailer cannot become unhitched while being towed.

When the trailer boat is completely unfolded to the position shown in Fig. 10 with the sterns of sections 4 and 5 together, then eyelets 40, fixed on the stern end of section 4, fit into eyelets 13 on the stern end of section 5 and bolts 14 are projected therethrough to interlock eyelets 40 and 13. The interlocked eyelets 40 and 13 cooperate with hinges 6 to rigidly hold the boat sections 4 and 5 together so that they act as one boat.

When sections 4 and 5 are used independently, hinge 6 is disconnected by removing the hinge pin therefrom.

I claim:

1. In combination a trailer comprising two sections adapted to be juxtapositioned, a hitch for said trailer comprising two separable fasteners one of which is hitched to one of the trailer sections and the other of which is adapted for attachment to a towing vehicle, means for interengaging said separable fasteners, handle means on said trailer for actuating said interengaging means and latching means effective to latch over said handle means and lock said interengaging means in interengaging position, said latching means being positioned between adjacent edges of said trailer sections when the trailer sections are in juxtaposition so as to be rendered inaccessible and when the trailer sections are moved out of juxtaposition then said latching means being exposed and actuatable to release said handle and interengaging means whereby the trailer can be unhitched from its towing vehicle.

2. In combination a trailer comprising two sections adapted to be positioned one upon the other, a hitch for said trailer comprising two separable members one of which is mounted upon the trailer and the other of which is adapted for mounting on a towing vehicle, a releasable driving connection for interengaging said separable hitch members, manually operable retracting means for said connection, a latch interengageable with said manually operable retracting means for latching the same against actuation, said latch being mounted on one of said trailer sections so as to be positioned within the confines of said two trailer sections when the trailer sections are positioned one upon the other whereby said latch is inaccessible to release said manually operable retracting means for actuation.

3. In combination a trailer boat comprising two sections each a complete boat in itself, hinging means for hinging said sections together adjacent their top stern edges, each of said boat sections having a locking member secured to its stern and positioned between the hinged edge of the boat section and the bottom thereof, said locking members being arranged to be positioned adjacent each other when the boat sections are placed stern to stern, a bolt for interengaging said locking members whereby the locking members thus interengaged cooperate with the hinge to rigidly secure the boat sections stern to stern, a hitch member adapted for mounting on a towing vehicle, said hitch member having locking means adapted to be positioned adjacent the locking member on the lower boat section when said boat sections are folded one upon the other and arranged to be interengaged with said lower locking member by said bolt, and latch means for latching said bolt against movement and positioned between said boat sections when folded so that it is inaccessible for operation when said boat sections are in the folded position.

4. In combination, a trailer comprising two sections adapted to be folded one upon the other, a hitch for said trailer comprising two separable members one of said members being adapted for connection with a towing vehicle and the other member being mounted on one of said trailer sections, means for interengaging said separable hitch members, and latching means on said trailer shiftable to a latching position for locking said interengaging means in interengaged position, said latching means being carried by one of said sections and in said latching position being covered by the other trailer section so as to be inaccessible when the trailer sections are folded.

5. In combination, a trailer comprising two trailer sections adapted to be folded one upon the other, a hitch for said trailer comprising two separable members one mounted on the trailer and the other adapted for connection to a towing vehicle, means for interengaging said separable hitch members, and latching means on said trailer movable to a position for locking said interengaging means in interengaged position, said latching means being positioned between said trailer sections such that in the folded position one of said trailer sections coacts with said latching means to prevent its movement from said latching position whereby said interengaging means are locked in interengaged position.

6. In combination, a trailer comprising at least two sections adapted to be juxtaposed, a hitch for said trailer comprising two separable members one of which is mounted on the trailer and the other of which is adapted for mounting on a towing vehicle, means for interengaging said separable hitch members, actuating means on said trailer for interengaging and releasing said interengaging means, and a shiftable latch for locking said actuating means against operation, said latch being carried by one of said sections and covered by the other section so as to be incapable of being shifted to release said actuating means when the trailer sections are in juxtaposition.

7. In combination, a trailer comprising at least two sections adapted to be juxtaposed, a hitch for said trailer comprising two separable members one of which is mounted on the trailer and the other of which is adapted for mounting on a towing vehicle, means for interengaging said separable hitch members, manually actuatable means on said trailer for operating said interengaging means, a latch for holding said manually actuatable means against actuation, said latch being mounted on one of said trailer sections and positioned between said juxtaposed trailer sections, said trailer sections when in juxtaposition cooperating with and covering said latch in latching position whereby said manually actuatable means cannot be actuated to disengage said separable hitch members.

8. In combination, a trailer comprising two sections hinged together so as to be foldable one upon the other, a pair of hitch members one of which is carried by one of said trailer sections and the other of which is adapted to be mounted on a towing vehicle, a bolt adapted to be projected through said hitch members for connecting said hitch members together, and an arm movably mounted on one of said sections and arranged in one position to hold said bolt in said projected position to lock said hitch members together, said arm in said locking position projecting between adjacent edges of said trailer sections so as to be inaccessible for movement when the trailer sections are folded.

9. In combination, a trailer comprising two sections to be folded one upon the other, a pair of separable hitch members one mounted on the trailer and the other adapted for mounting on a towing vehicle, means for releasably interlocking said hitch members, an arm for actuating said interlocking means, said arm being mounted on one of said trailer sections for movement from a position wherein said interlocking means release said hitch members to a position wherein said interlocking means lock said hitch members together, and handle means on said arm adapted to be gripped for moving said arm to said locking and releasing positions, said handle means being positioned between and covered by adjoining portions of said trailer sections when the trailer sections are in folded position so as to be inaccessible for moving said arm out of locking position.

10. In combination, a trailer comprising two sections adapted to be juxtaposed, means on said trailer for holding said sections in juxtaposition, a pair of separable hitch members one mounted on said trailer and the other adapted for mounting on a towing vehicle, a member adapted to be shifted to a position interengaging said hitch members, manually actuatable means on one of said sections operable to shift said shiftable member to and from said interengaging position, and a latch for latching said manually actuatable means against operation when said shiftable member is in interengaged position, said latch and at least a portion of said manually actuatable means in latched position being positioned between said juxtaposed trailer sections such that said manually actuatable means can be unlatched only after said sections are moved out of juxtaposition.

11. In combination, a trailer comprising two sections hinged together at an adjacent end so as to be foldable one upon the other, a pair of separable hitch members one mounted on said trailer and the other adapted for mounting on a towing vehicle, said hitch members having apertures adapted to be aligned, a bolt adapted to be projected through said apertures when said apertures are aligned for connecting said hitch members together, means on said trailer operable to project said bolt into and retract said bolt from said aligned apertures, and a latch movable to latch said bolt projecting means against operation when said bolt is in the projected position, said latch being mounted on one of said sections such that its movement to an unlatching position is prevented by an obstructing portion of said other trailer section when the trailer sections are folded one upon the other.

12. The combination as set forth in claim 11 wherein said adjacent ends of said trailer sections are provided with edges which register with one another when the trailer sections are in folded position and wherein said latch is mounted on one of said edges so as to be prevented from being moved to said unlatched position by said other edge when the trailers are in folded position.

STANLEY R. DU BRIE.

REFERENCES CITED

The following references are of record in the file of this patent:

UNITED STATES PATENTS

| Number | Name | Date |
|---|---|---|
| 773,537 | Boese | Nov. 1, 1904 |
| 1,691,633 | Bertram | Nov. 13, 1928 |
| 2,157,186 | Pinter, Sr., et al. | May 9, 1939 |